United States Patent
Rawat et al.

(10) Patent No.: US 7,780,857 B2
(45) Date of Patent: Aug. 24, 2010

(54) SOLID COMPOSITION FOR TREATING WATER

(75) Inventors: Nidhi Rawat, Duluth, GA (US); David F. Purdy, Decatur, GA (US); Michael J. Engram, Dacula, GA (US)

(73) Assignee: Chemtura Corporation, Middlebury, CT (US)

( * ) Notice: Subject to any disclaimer, the term of this patent is extended or adjusted under 35 U.S.C. 154(b) by 0 days.

(21) Appl. No.: 12/581,359

(22) Filed: Oct. 19, 2009

(65) Prior Publication Data

US 2010/0055203 A1    Mar. 4, 2010

Related U.S. Application Data

(62) Division of application No. 11/975,574, filed on Oct. 18, 2007, now Pat. No. 7,625,496.

(60) Provisional application No. 60/856,422, filed on Nov. 3, 2006.

(51) Int. Cl.
  *C02F 1/00* (2006.01)
  *C02F 1/68* (2006.01)
  *C02F 1/76* (2006.01)
  *C02F 5/02* (2006.01)
  *C11D 7/16* (2006.01)

(52) U.S. Cl. .................. 210/749; 210/697; 210/753; 210/754; 210/756; 252/175; 252/187.25; 510/382; 510/510; 510/512

(58) Field of Classification Search ............ 210/749, 210/753, 754, 756, 697; 510/382, 510, 512; 252/187.25; 424/601, 657, 659
See application file for complete search history.

(56) References Cited

U.S. PATENT DOCUMENTS

| 3,085,975 | A | * | 4/1963 | Jennings | ............... 210/697 |
| 3,108,078 | A | | 10/1963 | Wixon | |
| 3,488,420 | A | | 1/1970 | Keast | |
| 3,793,216 | A | | 2/1974 | Dychdala et al. | |
| 4,389,318 | A | | 6/1983 | Wojtowicz | |
| 5,409,713 | A | | 4/1995 | Lokkesmoe et al. | |
| 5,478,482 | A | | 12/1995 | Jones et al. | |
| 5,498,415 | A | | 3/1996 | Jones | |
| 5,514,287 | A | * | 5/1996 | Jones et al. | ............... 210/753 |
| 5,648,314 | A | | 7/1997 | Lachocki et al. | |
| 5,670,059 | A | | 9/1997 | Jones et al. | |
| 6,426,317 | B1 | | 7/2002 | Garris et al. | |
| 6,863,830 | B1 | * | 3/2005 | Purdy et al. | ............... 210/756 |
| 6,969,527 | B2 | | 11/2005 | Brennan et al. | |
| 7,045,077 | B2 | | 5/2006 | Garris | |
| 2005/0013878 | A1 | | 1/2005 | Mingzhong et al. | |
| 2005/0279971 | A1 | | 12/2005 | Garris | |
| 2006/0014659 | A1 | | 1/2006 | Martin et al. | |
| 2006/0091356 | A1 | | 5/2006 | Pickens et al. | |
| 2006/0128584 | A1 | | 6/2006 | Garris | |
| 2007/0125979 | A1 | | 6/2007 | Lei et al. | |

FOREIGN PATENT DOCUMENTS

| EP | 0403465 | 6/1990 |
| EP | 1095910 | 5/2001 |
| JP | 363239203 | 10/1988 |

* cited by examiner

*Primary Examiner*—Lorna M Douyon
*Assistant Examiner*—Tanisha Diggs
(74) *Attorney, Agent, or Firm*—Joseph Suhadolnik

(57) ABSTRACT

A method for reducing the halogen off-gassing rate in a solid water treatment halogen-containing composition is provided comprising forming a solid water treatment halogen-containing composition comprising (a) a halogen containing source; (b) a boron-containing source and (c) a polyphosphate-containing source.

4 Claims, 4 Drawing Sheets

SOLID COMPOSITION FOR TREATING WATER

PRIORITY

This application is a division of the U.S. patent application Ser. No. 11/975,574, filed on Oct. 18, 2007, now U.S. Pat. No. 7,625,496, which claims the benefit under 35 U.S.C. §119 to U.S. Provisional Application No. 60/856,422, filed on Nov. 3, 2006, and entitled "SOLID COMPOSITION FOR TREATING WATER," the contents of which are incorporated by reference herein.

BACKGROUND OF THE INVENTION

1. Technical Field

The present invention generally relates to a solid composition for treating water, e.g., swimming pools, hot tubs, spas, toilets, etc.

2. Description of the Related Art

In order to insure that the water in, for example, a pool or spa, is safe, it must be properly sanitized to prevent any health problems arising due to such contaminants as, for example, algae, bacteria, or any other pathogens which may be in the water. Thus, it is the goal of any owner or operator of recreational water bodies, swimming pools, spas, hot tubs or the like to provide water which is safe and properly sanitized. To this end, the owner or operator may choose from a wide variety of biocidal chemical systems to ensure that a biocidally effective amount of a water-treating agent is present in the water body on a continuous basis.

The more commonly used biocidal agents are halogen-containing biocides. The halogen is typically chlorine and can be in a number of different forms, e.g., chlorine gas, alkali metal hypochlorites, alkaline earth metal hypochlorites, halogenated hydantoins and chlorinated isocyanuric acid analogues. Representative examples of such halogen-containing biocides include sodium hypochlorite (liquid bleach), calcium hypochlorite, lithium hypochlorite, chlorinated isocyanurates, etc. When any of these materials interact with water, they undergo hydrolysis to form free chlorine consisting predominantly of hypochlorous acid (HOCl), which is the sanitizing agent, and hypochlorite ion.

Chloroisocyanuric acids (also known as chloroisocyanurates) are stabilized organic chlorine compounds. Examples of such chlorine compounds are sodium or potassium dichloro-s-triazinetrione (commonly known as dichlor) and trichloro-s-triazintrione (commonly known as trichlor, or TCCA). Both dichlor and trichlor are used for treating water bodies. When rapid chlorine delivery is desired, dichlor is commonly used due to its greater solubility whereas trichlor is commonly used when a slow and sustained release of chlorine delivery is desired for a longer period of time due to its lower solubility. Generally, trichlor is compressed into a tablet form for ease of application and use which further slows and prolongs the release of chlorine to the water source.

It is common practice to blend other performance enhancing chemicals with the halogen-containing biocides to provide multifunctionality to the compositions which is highly desirable for use in water treatment applications. Examples of such performance enhancing chemicals include algicides, algistats, flocculants, scale inhibitors, water softeners, dissolution control aids, chelants, tabletting aids, binders, colorants, and fragrances.

It is well known to combine a boron source material such as boric acid or borax with trichlor along with other additives such as a non-halogen oxygen donor material or glycoluril. See, e.g., U.S. Pat. Nos. 5,478,482; 5,514,287 and 5,670,059. The addition of a boron source to a chlorine source such as trichlor has typically been used by the industry for the purpose of providing algistatic properties in addition to lowering the cost of the composition. However, one problem associated with this combination is that the compressed solid composition has a propensity to dissolve at a faster rate than trichlor itself. See, e.g., U.S. Pat. No. 5,648,314. This rapid dissolution of the chlorine source such as trichlor is generally undesirable and inconvenient since users are then required to add the compositions more frequently to maintain the desired level of residual chlorine in the water. Another problem associated with this combination is that boron sources are known to promote the chlorine off-gassing in a trichlor formulation.

Trichlor is also known to be formulated with dissolution aids to increase the speed of dissolution. Examples of such dissolution aids include salts such as alkali metal and alkaline earth metal carbonate salts, including sodium carbonate, sodium bicarbonate, potassium carbonate and calcium carbonate as disclosed in U.S. Pat. Nos. 4,389,318 . 6,426,317 teaches the use of alkali metal salt of 1,3,5-triazine-2, 4,6-triones as a dissolution accelerant for trichlor.

Another performance enhancing additive that is commonly added to a trichlor composition is polyphosphates. It is also well known that the addition of a polyphosphate softens the water and helps minimize the scale build up on pipes and heat exchangers. See, e.g., U.S. Pat. No. 3,488,420.

However, there are drawbacks to using many of these additives. Most of these functional additives are highly water soluble and tend to make such trichlor compressed solid compositions dissolve faster than that made from trichlor alone. Trichlor products also give off chlorine gas and in combination with some of these additives also impart chemical instability in the final formulation which is of concern for sale on a commercial level.

A need therefore exists for improved solid water treatment compositions containing a halogen-containing source such as a chlorine source for treatment of water without affecting dissolution while reducing halogen off-gassing, e.g., chlorine off-gassing.

SUMMARY OF THE INVENTION

In accordance with one embodiment of the present invention, a solid water treatment composition is provided comprising (a) a halogen-containing source; (b) a boron-containing source; and (c) a polyphosphate-containing source.

In accordance with a second embodiment of the present invention, a process for preparing a solid water treatment composition is provided comprising (a) dry blending (i) a halogen-containing source; (ii) a boron-containing source; and (iii) a polyphosphate-containing source; (b) granulating the blend into granules; and (c) tableting the granules.

In accordance with a third embodiment of the present invention, a process for preparing a solid water treatment composition is provided comprising (a) dry blending (i) a halogen-containing source; and (ii) a polyphosphate-containing source; (b) granulating the blend into granules; (c) blending the granules with a boron-containing source; and (d) tableting the blended granules.

In accordance with a fourth embodiment of the present invention, a method for controlling microbial growth in a water system is provided comprising adding to the water system a solid water treatment composition comprising (a) a halogen-containing source; (b) a boron-containing source; and (c) a polyphosphate-containing source.

In accordance with a fifth embodiment of the present invention, a method for reducing the halogen off-gassing rate in a solid water treatment halogen-containing composition is provided comprising forming a solid water treatment halogen-containing composition comprising (a) a halogen-containing source; (b) a boron-containing source and (c) a polyphosphate-containing source.

The solid water treatment compositions of the present invention containing a halogen-containing source, a boron-containing source and a polyphosphate-containing source advantageously possess a dissolution rate relatively similar to solid water treatment compositions containing a halogen-containing source alone. Additionally, the solid water treatment compositions of the present invention significantly reduce the halogen off-gassing, e.g., chlorine off-gassing, during use. In this manner, a longer lifespan of the solid water treatment compositions during use can be achieved while also reducing halogen off-gassing. This is particularly advantageous as chlorine off-gassing can lead to label fading, bleaching of bottles, pails and lids, and the degradation of cardboard. Furthermore, the odor associated with halogen off-gassing is unpleasant to the end-use consumer and absorbent sachets are typically co-packed with the end-use product to help mitigate this effect at an additional cost of material and labor.

DETAILED DESCRIPTION OF THE PREFERRED EMBODIMENTS

Figure 1:
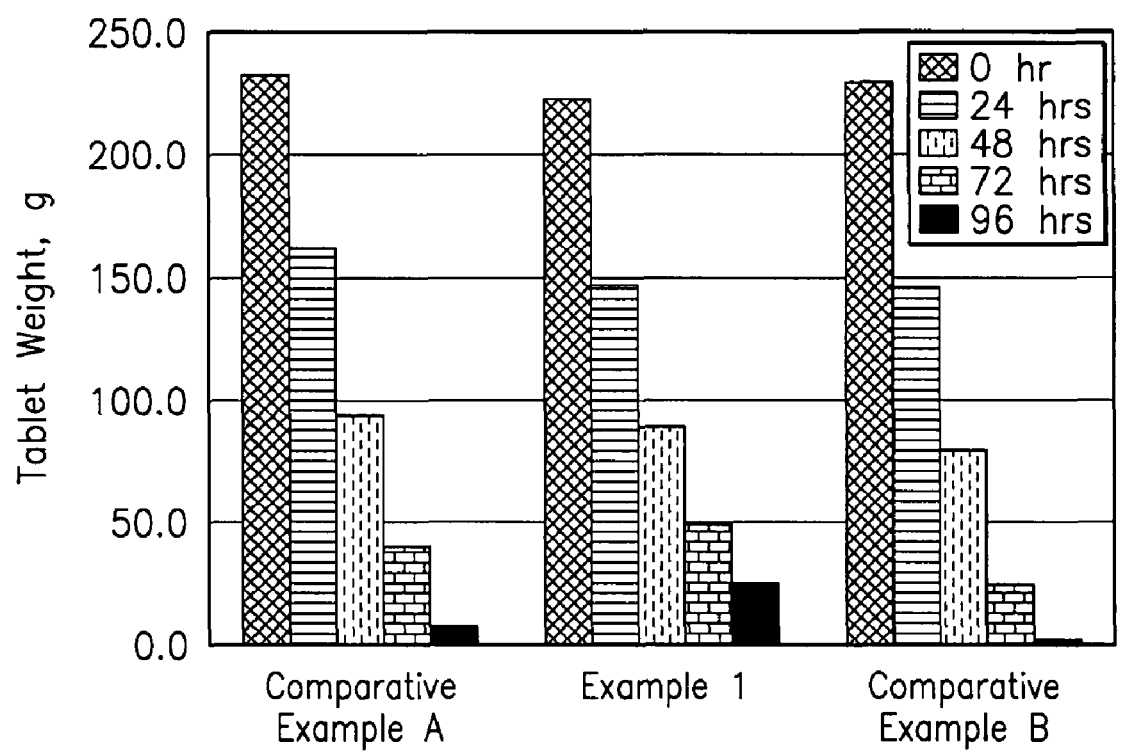
FIG. 1 is a bar graph showing the dissolution rates of a trichlor tablet, trichlor and sodium hexametaphosphate (SHMP) tablet and a tablet according to an embodiment of the present invention.

The present invention provides solid water treatment compositions and methods for the treatment of a variety of water systems. For example, the solid water treatment compositions and methods of the present invention are useful for the treatment of such as water systems as cooling towers, evaporative condensers, swimming pools, hot tubs, spas and toilets. The solid compositions are readily adapted for use in these and other environments. In one embodiment, a solid water treatment composition contains at least (a) a halogen-containing source; (b) a boron-containing source; and (c) a polyphosphate-containing source. The solid water treatment compositions can be in any suitable solid form, e.g., tablet, powder, or a stick The halogen-containing source is any compatible halogen material useful in solid form. Suitable halogens include chlorine or bromine, and may be any solid-form material which provides the halogen in the form of hypohalite ions, i.e., hypochlorite or hypobromite ions, or as hypohalous acid. For example, the halogen containing source may include various chlorine compounds including chlorinated hydantoins, calcium hypochlorite, lithium hypochlorite, sodium dichloro-s-triazinetrione, potassium dichloro-s-triazinetrione, trichloro-s-triazinetrione and the like and mixtures thereof. Suitable bromine compounds include brominated hydantoins. Representative examples of halogenated hydantoins include 1-bromo-3-chloro-5,5-dimethylhydantoin (BCDMH), 1,3-dichloro-5,5-dimethylhydantion (DCDMH), 1,3-dichloro-5-ethyl-5-methylhydantoin, 1,3-dibromo-5,5-dimethylhydantion (DBDMH) and the like and mixtures thereof.

In one embodiment, the halogen-containing source is dichlor, trichlor and mixtures thereof. In another embodiment, the halogen-containing source is trichlor. In one embodiment, the halogen-containing source is a N-halogenated compound such as halogenated triazinetrione and halogenated hydantoin as discussed above and the like and mixtures thereof.

The boron-containing source is any suitable boron compound or mixture thereof. For example, the boron-containing source can be boric acid, boric oxide (anhydrous boric acid), compounds having the formula $MnB_xO_y \cdot ZH_2O$, wherein M is any alkali earth or metal/non-metallic cation, e.g., sodium, potassium, calcium, magnesium and ammonium, n is 1 to 3, x is any whole number from 2 to 10, y is $(3x/2)+1$, and z is 1 to 14, and the like and mixtures thereof. Representative examples of compounds having the formula $MnB_xO_y \cdot ZH_2O$ include disodium tetraborate decahydrate, disodium tetraborate pentahydrate, disodium tetraborate tetrahydrate, disodium octaborate tetrahydrate, sodium pentaborate pentahydrate, sodium metaborate tetrahydrate, sodium metaborate bihydrate, dipotassium tetraborate tetrahydrate, potassium pentaborate tetrahydrate, diammonium tetraborate tetrahydrate, ammonium pentaborate tetrahydrate and the like and mixtures thereof.

The polyphosphate-containing source is any suitable polyphosphate compound or mixture thereof. Representative examples of polyphosphates include alkali metal polyphosphates such as sodium hexametaphosphate. In one embodiment, the polyphosphate-containing source is one or more of sodium hexametaphosphate, sodium polyphosphate, sodium tripolyphosphate or sodium pyrophosphate.

In general, the solid water treatment compositions of the present invention will contain from about 65 to about 98 weight percent and preferably from about 85 to about 95 weight percent of the halogen-containing source, from about 0.2 to about 2.5 weight percent and preferably from about 0.5 to about 1.5 weight percent of the boron-containing source and from about 1 to about 10 weight percent and preferably from about 4 to about 7 weight percent of the polyphosphate-containing source, based on the total weight of the composition.

The solid water treatment compositions of the present invention can also contain one or more conventional additives as known in the art. Suitable additives and the amounts to use may be readily determined by one skilled in the art. Examples of such additives include, but are not limited to, a clarifier, algaecide, algistat, tableting aids, coloring agents, dyes, fragrances and the like and mixtures thereof.

The solid water treatment compositions can be formed into any suitable solid form, e.g., tablets, pack or a stick. Tablets containing the compositions according to the present invention may be produced by any standard tabletting technique, e.g. by wet granulation, dry granulation or direct compression. Blending and granulating of the tablet constituents during the preparation of a tablet composition may be accomplished by any method which causes the composition to become blended. Once the tablet compositions are prepared, they may be formed into various shapes. In a preferred embodiment, the tablet compositions are pressed into a shape. This process may involve placing the tablet composition into a form and applying pressure so as to cause the composition to assume the shape of the surface of the form with which the composition is in contact. Examples of presses which can be used to compress the tablet compositions of the present invention include hydraulic presses such as a Carver Press and the like or mechanical presses such as a Baldwin press and the like.

In one embodiment, the solid water treatment compositions of the present invention is prepared by (a) dry blending (i) a halogen-containing source; (ii) a boron-containing source and (iii) a polyphosphate-containing source; (b) granulating the blend into granules; and (c) tableting the granules.

In another embodiment, the solid water treatment compositions of the present invention is prepared by (a) dry blending (i) a halogen-containing source; and (ii) a polyphosphate-containing source; (b) granulating the blend into granules; (c) blending the granules with a boron-containing source; and (d) tableting the blended granules.

In the water treatment method of this invention the one or more solid water compositions as described above are inserted into the water body to be treated whereby the tablet dissolves over time.

The following examples are provided to enable one skilled in the art to practice the invention and are merely illustrative of the invention. The examples should not be read as limiting the scope of the invention as defined in the features and advantages.

The general procedure for all examples was as follows. Tablets weighing about 6 ounces (oz.) and 8 oz. were manufactured on either a laboratory or commercial press, e.g., a hydraulic press such as a carver press or a mechanical press such as a Baldwin press. The compression time and pressure were controlled to yield tablets that had crush strengths similar to commercial trichlor products with similar dimensions and mass. All tablets were made having a 3" diameter.

COMPARATIVE EXAMPLE A

Trichlor tablets were prepared by compressing trichlor in granular form into 8 oz. tablets on a commercial press.

Dissolution tests were then carried out to determine the dissolution rate of the control tablet of this example. The test results are set forth below in Table 1 and in FIG. 1. The dissolution test was carried out as follows.

Dissolution

Tablet dissolution rates were monitored in a 5,000 gallon (19,000 L) pool equipped with two skimmers that are typically used in swimming pools. Flow rates through the skimmers were maintained at 20 gallons/minute (76 L/min), unless otherwise noted. The pump run time was 10 hours/day to maintain water flow through the skimmers. The pool temperature was maintained at 85° F. (or 26.7° C.). In one study, the skimmer basket was charged with one tablet each of Comparative Example A, Example 1 and Comparative Example B. In another study, the skimmer basket was charged with one tablet each of Comparative Examples C-E. In another study, the skimmer basket was charged with one tablet each of Comparative Example F-H.

The initial tablet weight was determined before placing the tablet in the skimmer. The skimmer basket was removed every 24 hours from the skimmer and the tablet was gently patted dry and weighed. Also, the skimmer basket was periodically rotated every 24 hours by 180 degrees to expose the tablets to the similar water flow conditions in the skimmer. Throughout the course of the study, the pool water was maintained at a pH of 7.2 to 7.8, total alkalinity of 100 to 175 ppm, and calcium hardness of 175 to 300 ppm.

TABLE I

Dissolution of Trichlor (8 oz. Tablet)

Tablet Weight, g

|  | 0 hr | 24 hrs | 48 hrs | 72 hrs | 96 hrs |
| --- | --- | --- | --- | --- | --- |
| Study 1 | 230.00 | 162.46 | 94.29 | 33.66 | 9.19 |
| Study 2 | 235.56 | 174.69 | 107.72 | 50.23 | 4.80 |
| Study 3 | 234.69 | 148.66 | 79.62 | 34.20 | 9.66 |
| Avg. | 233.42 | 161.94 | 93.88 | 39.36 | 7.88 |

EXAMPLE 1

A compressed tablet was prepared from trichlor (94 wt. %), sodium hexametaphosphate (SHMP) (6 wt. %), boric acid (BA) (0.75 wt. %) and pigment (Orcolite Blue) (0.2 wt. %). First, trichlor and SHMP were blended together and then compressed and comminuted to provide co-compacted granules. The co-compacted granules were blended with BA and pigment in a V-blender and then subsequently compressed into 8 oz. tablets on a commercial press. Note that the total amount of ingredients in this composition exceeded 100% on weight basis.

The tablets were then subjected to the dissolution test discussed above. The test results are set forth below in Table II and FIG. 1.

TABLE II

Dissolution of Trichlor with SHMP and BA (8 oz. Tablet)

Tablet Weight, g

|  | 0 hr | 24 hrs | 48 hrs | 72 hrs | 96 hrs |
| --- | --- | --- | --- | --- | --- |
| Study 1 | 219.33 | 147.92 | 92.51 | 47.83 | 26.29 |
| Study 2 | 222.24 | 162.38 | 98.03 | 56.53 | 24.99 |
| Study 3 | 227.35 | 132.18 | 74.74 | 42.75 | 23.12 |
| Avg. | 222.97 | 147.49 | 88.43 | 49.04 | 24.80 |

As the dissolution data show, the tablet of the present invention has a dissolution rate similar to the trichlor tablet of Comparative Example A.

The test results of Table II are unexpected and contrary to what has been reported thus far in the prior art that trichlor compositions with a variety of water soluble additives increase the dissolution rate of trichlor tablets. The tablet of Example 1 containing trichlor, sodium hexametaphosphate and boric acid possessed similar dissolution characteristics to the tablet of Comparative Example A containing trichlor alone.

COMPARATIVE EXAMPLE B

A solid compressed tablet was prepared with trichlor (94 wt. %) and SHMP (6 wt. %). Using the general procedure described above, the tablet ingredients were blended, compressed and comminuted to provide co-compacted granules that are tableted into 8 oz. tablets on a laboratory press. The blend was compressed into 8 oz. tablets on a commercial press.

The dissolution rate of these tablets was determined as described above. The test results are set forth below in Table III and FIG. 1.

TABLE III

Dissolution of Trichlor with SHMP (8 oz. Tablet)

| | Tablet Weight, g | | | | |
|---|---|---|---|---|---|
| | 0 hr | 24 hrs | 48 hrs | 72 hrs | 96 hrs |
| Study 1 | 228.42 | 143.39 | 80.56 | 23.28 | 1.78 |
| Study 2 | 232.1 | 158.33 | 94.01 | 28.18 | 0.00 |
| Study 3 | 227.1 | 138.37 | 64.93 | 21.21 | 1.52 |
| Avg. | 229.18 | 146.70 | 79.83 | 24.22 | 1.10 |

As the dissolution data show, the tablet of Comparative Example B containing trichlor and SHMP has a faster dissolution rate than the tablet of Comparative Example A containing trichlor alone. This finding is in contrast to the results reported in U.S. Pat. No. 3,488,420 which shows the addition of sodium hexametaphosphate to trichlor results in a tablet with a much slower rate of dissolution.

Also, a comparison of the tablet of Comparative Example B with the tablet of Example 1 showed that addition of boric acid to the granular composition of trichlor and sodium hexametaphosphate tablet decreased the rate of dissolution of the tablet (FIG. 1).

COMPARATIVE EXAMPLES C-E

This example shows the effect of boric acid on the dissolution of a tablet containing trichlor. For these experiments, three 6 oz. tablets of the following compositions were made in the laboratory.

Comparative Example C—Trichlor tablet: Trichlor alone (100 wt. %) in granular form was compressed into a tablet on a laboratory press.

Comparative Example D—Trichlor (95 wt. %)+BA (5 wt. %) tablet: The materials were blended and compressed into a tablet on a laboratory press.

Comparative Example E—Trichlor (95 wt. %)+BA (5 wt. %) tablet: The materials were blended, compressed and comminuted to provide co-compacted granules. The co-compacted granules were subsequently compressed into a tablet on a laboratory press.

Figure 2:
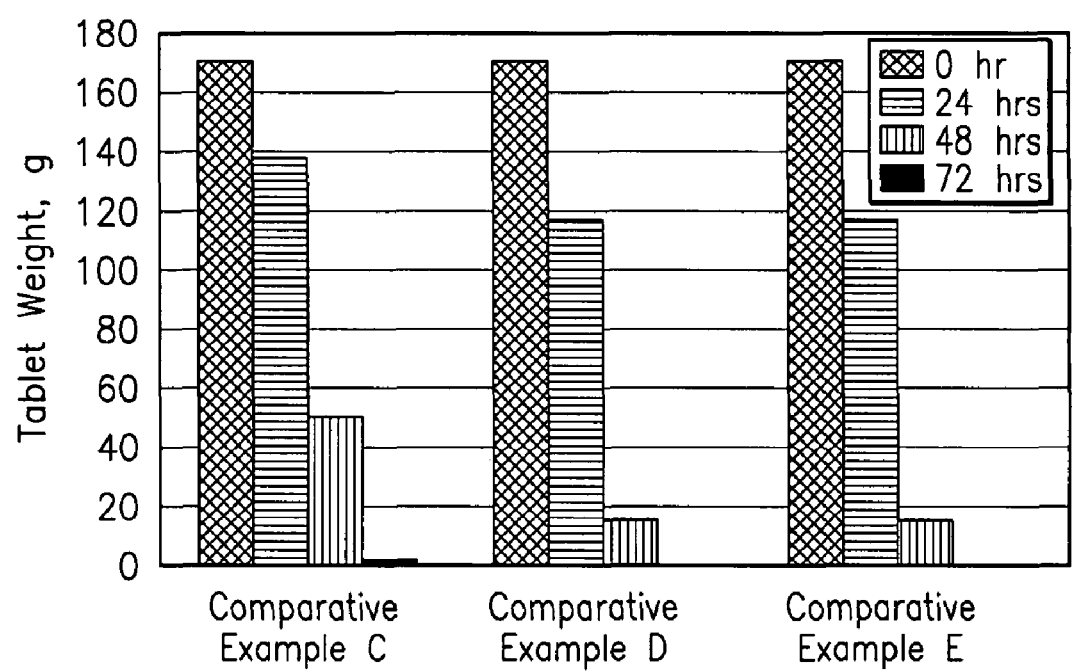
FIG. 2 is a bar graph showing the dissolution rates of boric acid on a trichlor tablet.

The dissolution rate of these tablets was determined as described above except the flow rate was 32 gpm. The test results for Comparative Examples C-E are set forth below in Table IV and FIG. 2.

TABLE IV

Effect of Boric Acid on Trichlor Dissolution (6 oz. Tablet)

| | Tablet Weight, g | | | |
|---|---|---|---|---|
| Comp. Ex. | 0 hr | 24 hrs | 48 hrs | 72 hrs |
| Comp. Ex. C | 170.56 | 137.97 | 50.50 | 1.70 |
| Comp. Ex. D | 170.47 | 117.08 | 15.30 | 0.00 |
| Comp. Ex. E | 170.67 | 117.43 | 14.85 | 0.00 |

As the dissolution data show, the tablets of Comparative Examples D and E containing trichlor and boric acid exhibited a significant increase in the dissolution rate compared to the tablet of Comparative C containing trichlor alone. The data further showed that there is no effect on tablet dissolution when either a blending processing method or co-compaction processing method is used in preparing the tablets of Comparative Examples D and E.

COMPARATIVE EXAMPLES F-H

This example compares the effect of different boron compounds on the dissolution of a tablet containing trichlor. For these experiments, three 8 oz. tablets of the following compositions were made in the laboratory:

Comparative Example F—Trichlor (100 wt. %) tablet: Trichlor in granular form was compressed into tablet on a laboratory press.

Comparative Example G—Trichlor (95 wt. %)+BA (5 wt. %) tablet: The materials were blended and compressed into a tablet on a laboratory press.

Comparative Example H—Trichlor (95 wt. %)+borax (5 wt. %) tablet: The materials were blended, compressed and comminuted to provide co-compacted granules. The co-compacted granules were subsequently compressed into a tablet on a laboratory press.

Figure 3:
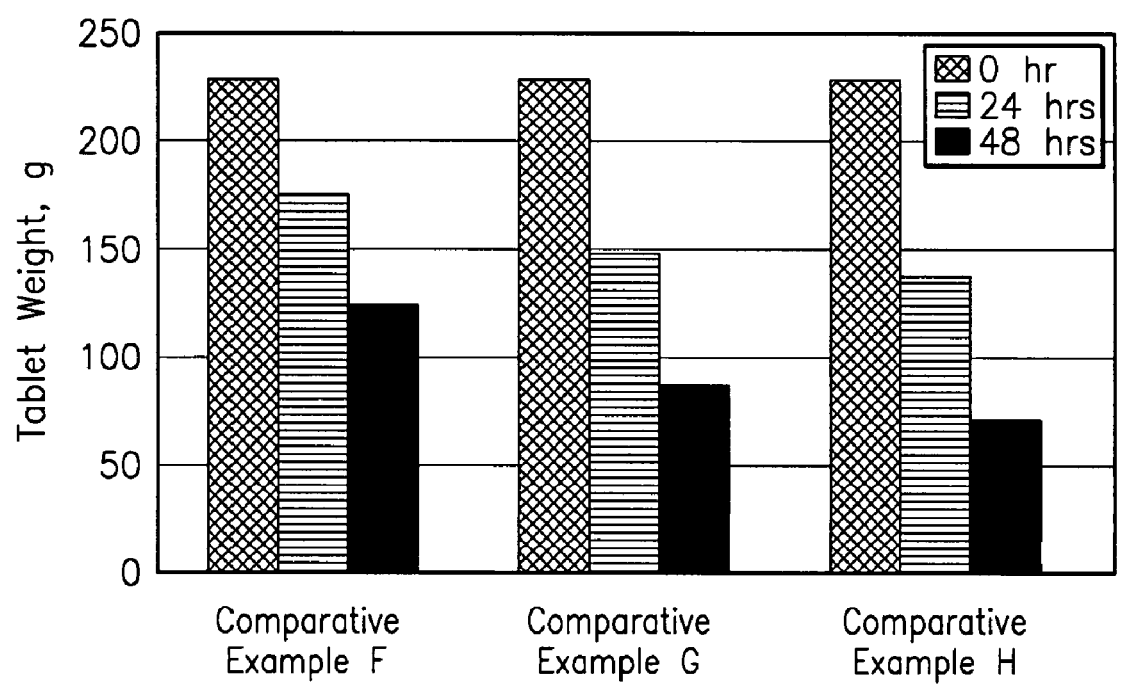
FIG. 3 is a bar graph showing the dissolution rates of boron compounds on a trichlor tablet.

The dissolution rate of these tablets was determined as described above except the pump flow rate was 33 gpm. The test results for Comparative Examples F-H are set forth below in Table V and FIG. 3.

TABLE V

Effect of Boron Compounds on Trichlor Dissolution (8 oz. Tablet)

| | Tablet Weight, g | | |
|---|---|---|---|
| Comp. Ex. | 0 hr | 24 hrs | 48 hrs |
| Comp. Ex. F | 227.79 | 174.53 | 124.37 |
| Comp. Ex. G | 227.31 | 147.45 | 86.79 |
| Comp. Ex. H | 228.01 | 137.39 | 71.61 |

As the dissolution data show, the addition of a boron compound to trichlor increased the dissolution of the tablet (Comparative Examples G and H) as compared to the tablet containing trichlor alone (Comparative Example F).

COMPARATIVE EXAMPLE I

Trichlor tablets (8 oz.) were prepared in substantially the same manner as in Comparative Example A.

EXAMPLE 2

A solid compressed tablet was prepared from trichlor (95 wt. %), SHMP (4 wt. %) and BA (1 wt. %). First, trichlor and SHMP were blended together and then compressed and comminuted to provide co-compacted granules. The co-compacted granules were blended with BA in a V-blender and then subsequently compressed into 8 oz. tablets on a commercial press.

EXAMPLE 3

Figure 4:
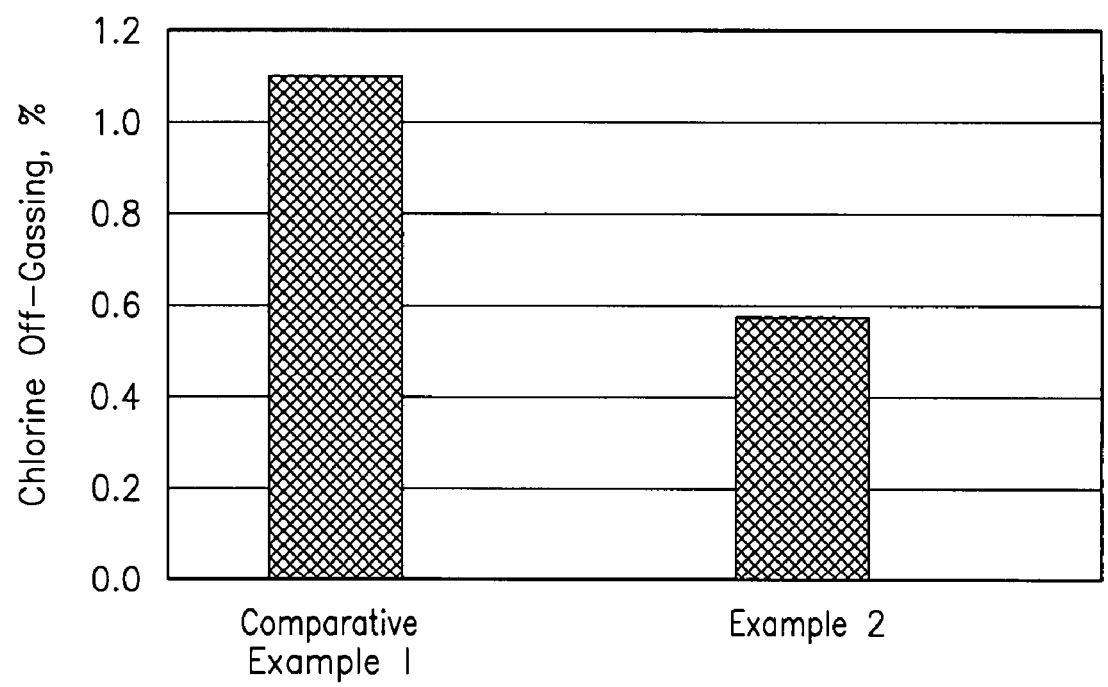
FIG. 4 is a bar graph showing the off-gassing rate of a trichlor tablet and a tablet according to an embodiment of the present invention.

This example illustrates that the solid water compositions of the present invention reduce off-gassing. Chlorine off-gassing was determined for 37 commercial production lots of the tablets of Comparative Example 1 and 12 tablets of Example 2. The chlorine off-gassing of the tablets of Comparative Example I and the tablets of Example 2 were predicted by heating a 20 g sample in a sealed ampoule at 60° C.±2° C. for 2 hours and determining the chlorine content in the sample headspace by gas chromatography. The results are set forth below in Table VI and FIG. 4.

TABLE VI

| Comp. Ex./Ex. | Chlorine off-gassing, % | Std. Dev. |
|---|---|---|
| Comp. Ex. I | 1.1047 | 0.2224 |
| Example 2 | 0.5730 | 0.1502 |

As the data show, a significant decrease in chlorine off-gassing can be obtained by using the tablet of Example 2 (within the scope of the present invention) as compared to the tablet of Comparative Example I (outside the scope of the present invention), i.e., 0.57% versus 1.10%. The difference in the chlorine off-gassing is a decrease of 48% which is an order of magnitude greater than would be expected from the relatively small decrease in trichlor concentration by the addition of SHMP (4 wt. %) and BA (1%).

While the invention has been illustrated and described in detail in the foregoing description, the same is to be considered illustrative and not restrictive in character, it being understood that only the preferred embodiment has been shown and described and that all changes and modifications that come within the spirit of the invention are desired to be protected.

The invention claimed is:

1. A method for reducing the halogen off-gassing rate in a solid halogen-containing composition, the method comprising forming a solid water treatment halogen-containing composition comprising from about 85 to about 98 weight percent trichloro-s-triazinetrione, from about 0.2 to about 2.5 weight percent boric acid, and from about 4 to about 10 weight percent sodium hexametaphosphate, based on the total weight of the composition.

2. The method of claim 1, wherein the trichloro-s-triazinetrione is present in an amount of about 85 to about 95 weight percent.

3. The method of claim 1, wherein the boric acid is present in an amount of about 0.5 to about 1.5 weight percent.

4. The method of claim 1, wherein the sodium hexametaphosphate is present in an amount of about 4 to about 7 weight percent.

* * * * *